United States Patent
Huang et al.

(10) Patent No.: US 10,465,304 B2
(45) Date of Patent: Nov. 5, 2019

(54) COMPOUND GREEN-ENERGY PURIFICATION DEVICE

(71) Applicants: Bo-Yu Huang, Taichung (TW); Bing-Hua Huang, Taichung (TW)

(72) Inventors: Bo-Yu Huang, Taichung (TW); Bing-Hua Huang, Taichung (TW)

(*) Notice: Subject to any disclaimer, the term of this patent is extended or adjusted under 35 U.S.C. 154(b) by 0 days.

(21) Appl. No.: 15/856,091

(22) Filed: Dec. 28, 2017

(65) Prior Publication Data
US 2018/0209055 A1 Jul. 26, 2018

(30) Foreign Application Priority Data
Jan. 24, 2017 (TW) .............................. 106102718 A (51) Int. Cl.
| | | |
|---|---|---|
| *C25B 15/08* | (2006.01) | |
| *B01D 5/00* | (2006.01) | |
| *B01D 19/00* | (2006.01) | |
| *C25B 1/04* | (2006.01) | |
| *F02B 77/04* | (2006.01) | |

(52) U.S. Cl.
CPC ............... *C25B 15/08* (2013.01); *B01D 5/00* (2013.01); *B01D 19/0031* (2013.01); *C25B 1/04* (2013.01); *F02B 77/04* (2013.01); *Y02E 60/366* (2013.01)

(58) Field of Classification Search
CPC .. C25B 15/08; C25B 1/04; B01D 5/00; B01D 19/0031; F02B 77/04; Y02E 60/366
See application file for complete search history.

(56) References Cited

U.S. PATENT DOCUMENTS

| | | | | |
|---|---|---|---|---|
| 2007/0281192 A1* | 12/2007 | Sasaki | ................ | B01D 19/0005 429/410 |
| 2010/0071868 A1* | 3/2010 | Reifel | ..................... | B23P 15/26 165/47 |
| 2016/0108528 A1* | 4/2016 | Lin | .......................... | C25B 1/04 204/276 |

* cited by examiner

*Primary Examiner* — Ciel P Thomas
(74) *Attorney, Agent, or Firm* — Leong C. Lei (57) ABSTRACT

A compound green-energy purification device includes a casing having a water inlet port and a gas outlet port, a filtration module arranged in the casing and includes a first filtration assembly and a second filtration assembly, an electrolysis unit arranged in the casing, and a separation base arranged in the casing and located between the filtration module and the electrolysis unit. The separation base includes a pipe and at least one hole formed therein such that the hole is located in a bottom of the separation base. Water is supplied through the water inlet port and flows through the hole of the separation base into the electrolysis unit to allow the electrolysis unit to heat and convert the water into steam, which moves through the pipe, the first filtration assembly, and the second filtration assembly so as to separate the water and the gas from each other.

3 Claims, 8 Drawing Sheets

COMPOUND GREEN-ENERGY PURIFICATION DEVICE

BACKGROUND OF THE INVENTION (a) Technical Field of the Invention

The present invention generally relates to a compound green-energy purification device, and more particularly to a device that achieves effective separation of water and gas for recycling and reuse of water resources that have not been evaporated into gas in order to provide an effect of saving energy.

(b) Description of the Prior Art

Most of automobiles and motorcycles that are available today involve fuel-combustion engines. The fuel-combustion engines generate power by combusting atomized fuel-air mixture and may suffer, after long-term use, carbon deposits generated in the combustion. Further, modern automobile and motorcycles are often used in metropolitan or urban areas for short distance travels and under such a condition, the automobiles and motorcycles are often operated at a low speed and must be frequently braked and slowed down to wait for green light. Thus, the engines of the automobiles and motorcycles are generally under a condition of long term operation at a low speed and this readily causes massive carbon deposit. The carbon is deposited in the engine and causes excessive consumption of fuel, poor operation performance, and being hard to start the engine.

To clean up the carbon deposit generated by the operation of automobiles and motorcycles, a vehicle carbon removing device is available. Such a vehicle carbon removing device is based on an operation of conducting hydrogen gas through a pipeline into an engine of an automobile or a motorcycle to allow hydrogen to combine with the deposited carbon, such that through the low burning point of hydrogen together with a supply of oxygen to assist burning, when the engine is put into operation, the combination of hydrogen and carbon deposit can be burnt out and the carbon deposit so burnt converts into tiny carbon molecules that are discharged through an exhaust pipeline. In this way, the issues of carbon built up in the engine, poor operation performance, and high fuel consumption can all be eliminated.

However, in the above device, hydrogen is supplied with a gas-water separation device, which electrolyzes water to generate hydrogen. However, the known gas-water separation device has a drawback that the efficiency of generation of hydrogen is low and it is generally not possible to effectively recycle and reuse the water resources.

In view of the above, the present invention aims to provide a compound green-energy purification device, which effectively separates water and gas and recycle and reuse water that has not been evaporated into gas in order to achieve an effect of saving energy.

SUMMARY OF THE INVENTION

The primary objective of the present invention is to provide a compound green-energy purification device, which effectively separates water and gas and recycle and reuse water that has not been evaporated into gas in order to achieve an effect of saving energy.

To achieve the above objective, the present invention provides a compound green-energy purification device, which comprises: a casing, which comprises a water inlet port and a gas outlet port, the water inlet port having an opening that is provided with and selectively closed by a lid; a filtration module, which is arranged in an interior of the casing, the filtration module comprising a first filtration assembly and a second filtration assembly; an electrolysis unit, which is arranged in the interior of the casing; and a separation base, which is arranged in the interior of the casing and is located between the filtration module and the electrolysis unit, the separation base comprising a pipe and at least one hole formed therein such that the hole is located in a bottom of the separation base, wherein when water is supplied through the water inlet port, water flows through the hole of the separation base and gets into the electrolysis unit to allow the electrolysis unit to heat and convert the water into steam, which moves, in sequence, through the pipe, the first filtration assembly, and the second filtration assembly so as to separate the water and the gas from each other and allow the gas to discharge to the outside of the casing through the gas outlet port.

In the above compound green-energy purification device, the first filtration assembly comprises: a bottom board and a plurality of filtration members, such that the plurality of filtration members are stacked, in sequence, on the bottom board to extend sideways. Each of the filtration members is provided, on a surface thereof, with a plurality of first blocking plates that are sequentially arranged and spaced from each other. Each of the first blocking plates is provided with one opening. The bottom board and each of the filtration members are each provided with a through hole formed therein such that the through holes are staggered with respect to each other.

In the above compound green-energy purification device, the second filtration assembly is arranged in a vertical direction in the interior of the casing and the second filtration assembly is set up at one lateral side of the first filtration assembly.

In the above compound green-energy purification device, the second filtration assembly further comprises a second filtration member, a gas outlet valve, a water inlet valve, a plurality of slope plates, a separation board, and a plurality of second blocking plates. The gas outlet valve is provided on an upper end of the second filtration assembly and the water inlet valve is provided on a lower end of the second filtration assembly. The slope plates and the separation board are provided on a surface of the second filtration member such that the slope plates are sequentially arranged in a direction from top to bottom to be spaced from each other. Each of the slope plates is provided with multiple ones of the second blocking plates, such that the multiple second blocking plates are sequentially arranged in a direction from left to right to be spaced from each other. The separation board is arranged adjacent to the slope plates, and the separation board is provided on one side thereof with a plurality of inclined plates, such that the inclined plates are sequentially arranged in a direction from top to bottom to be spaced from each other. The inclined plates are arranged alternate with multiple ones of the second blocking plates.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings, identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring collectively to FIGS. 1-8, the present invention provides a compound green-energy purification device, which comprises: a casing 10, which comprises a water inlet port 12 and a gas outlet port 11, wherein the water inlet port 12 having an opening that is provided with a lid 13; a filtration module 20, which is arranged in an interior of the casing 10, wherein the filtration module 20 comprises: a first filtration assembly 21 and a second filtration assembly 22; an electrolysis unit 40, which is arranged in the interior of the casing 10; and a separation base 30, which is arranged in the interior of the casing 10 and is located between the filtration module 20 and the electrolysis unit 40, wherein the separation base 30 comprises a pipe 31 and at least one hole 32 formed therein such that the hole 32 is located in a bottom of the separation base 30, wherein when water is supplied through the water inlet port 12, water flows through the hole 32 of the separation base 30 and gets into the electrolysis unit 40 to allow the electrolysis unit 40 to heat and convert the water into steam, which moves, in sequence, through the pipe 31, the first filtration assembly 21, and the second filtration assembly 22 so as to separate the water and the gas from each other and allow the gas to discharge to the outside of the casing 10 through the gas outlet port 11.

Figure 1:
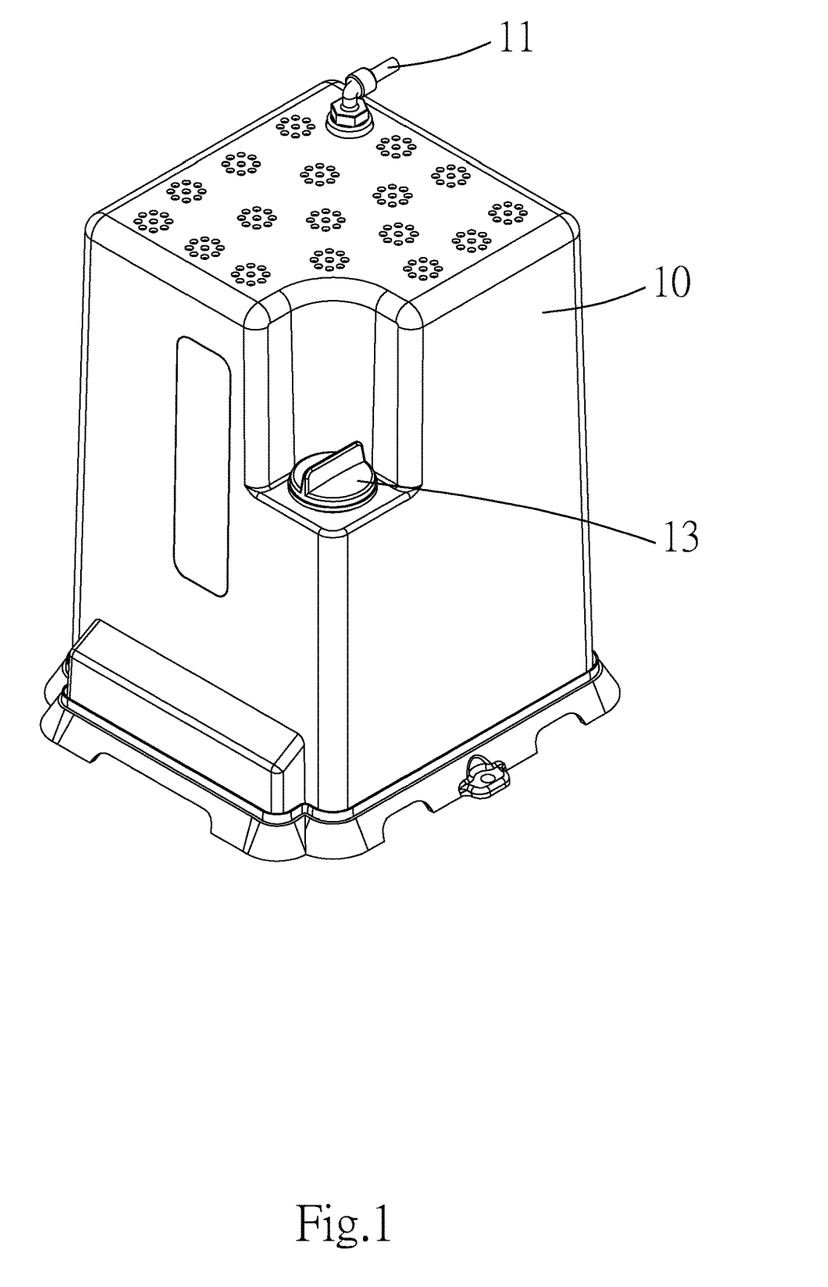
FIG. 1 is a perspective view of the present invention.
Figure 2:
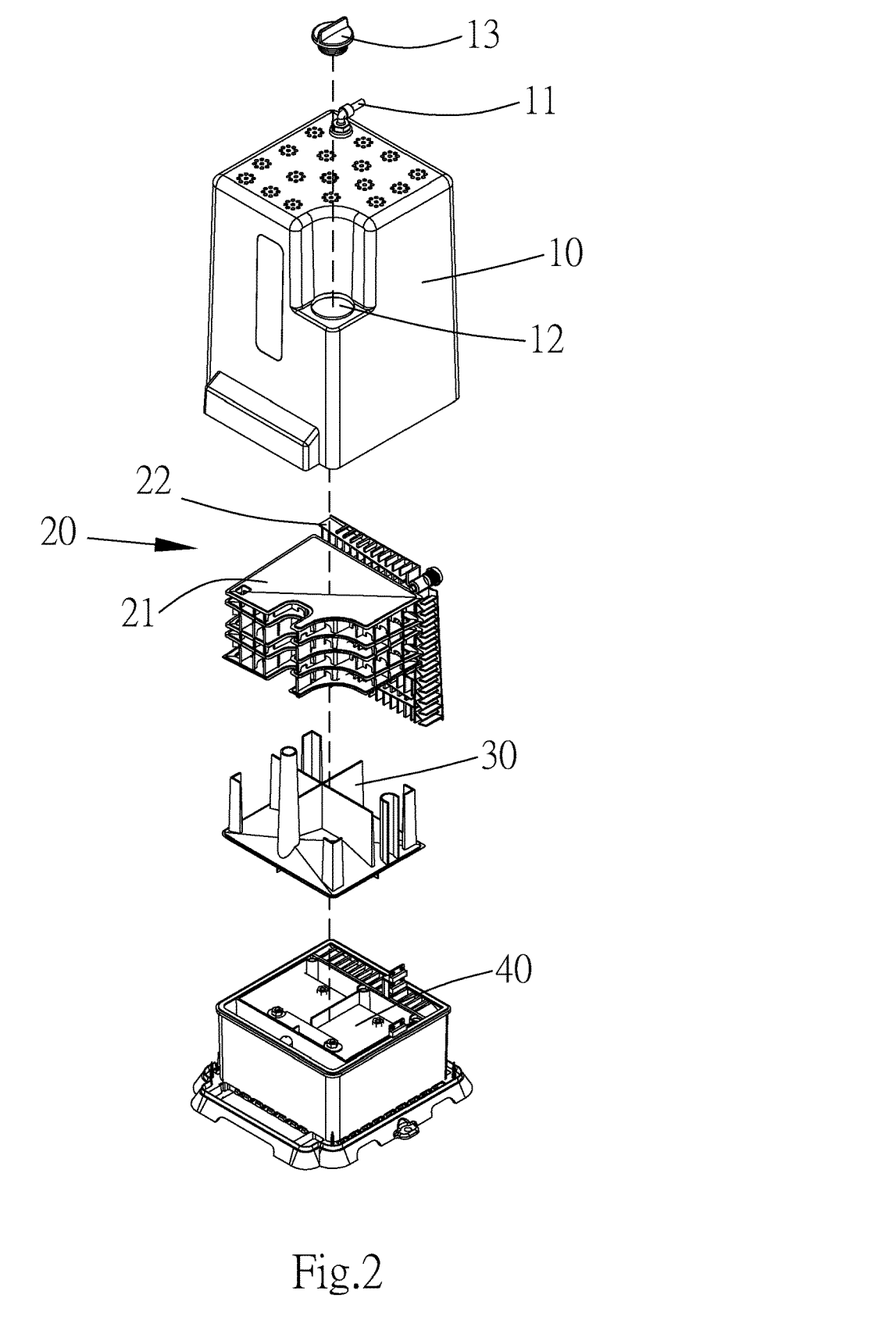
FIG. 2 is an exploded view showing a structure inside a casing of the present invention.
Figure 3:
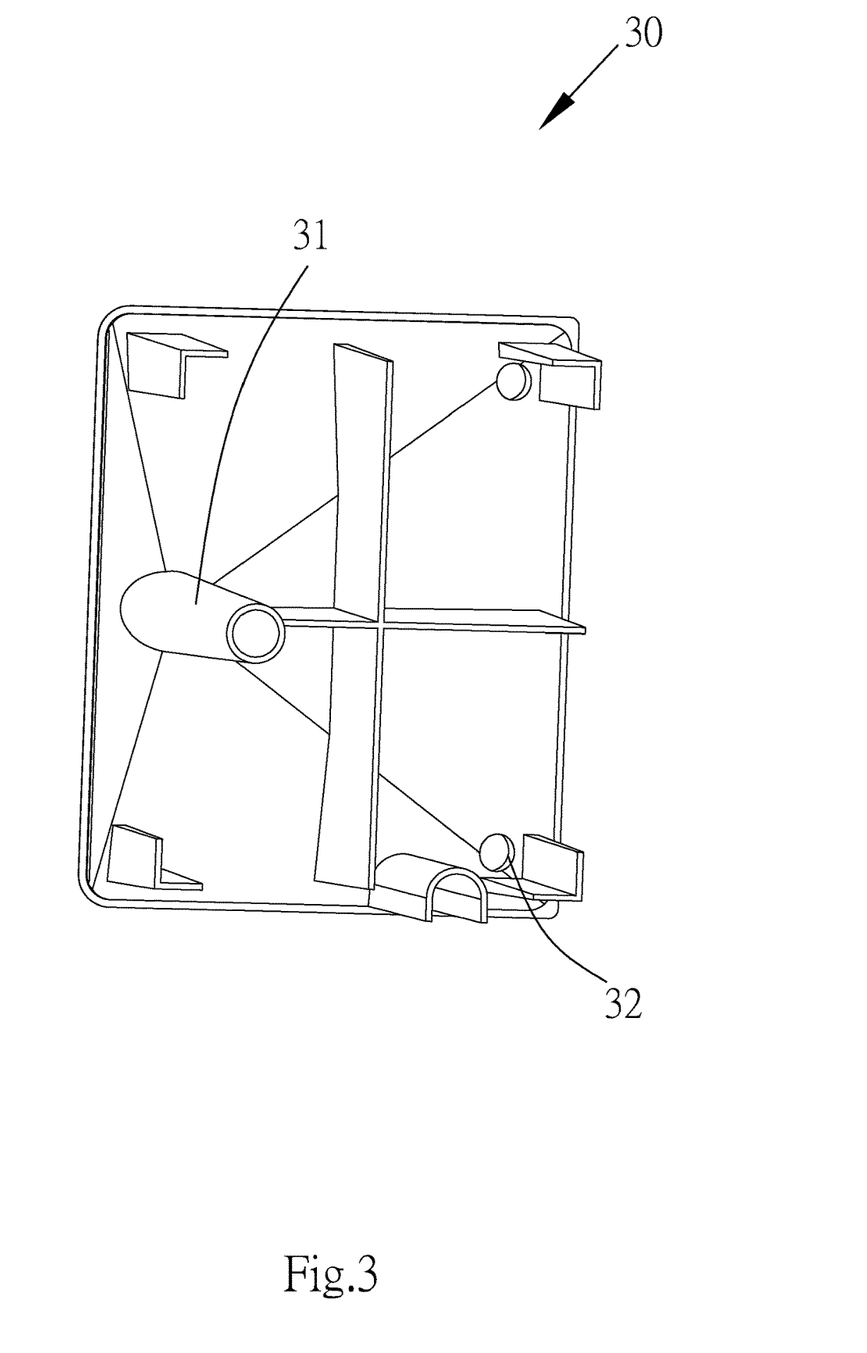
FIG. 3 is a schematic view showing a separation base of the present invention.
Figure 4:
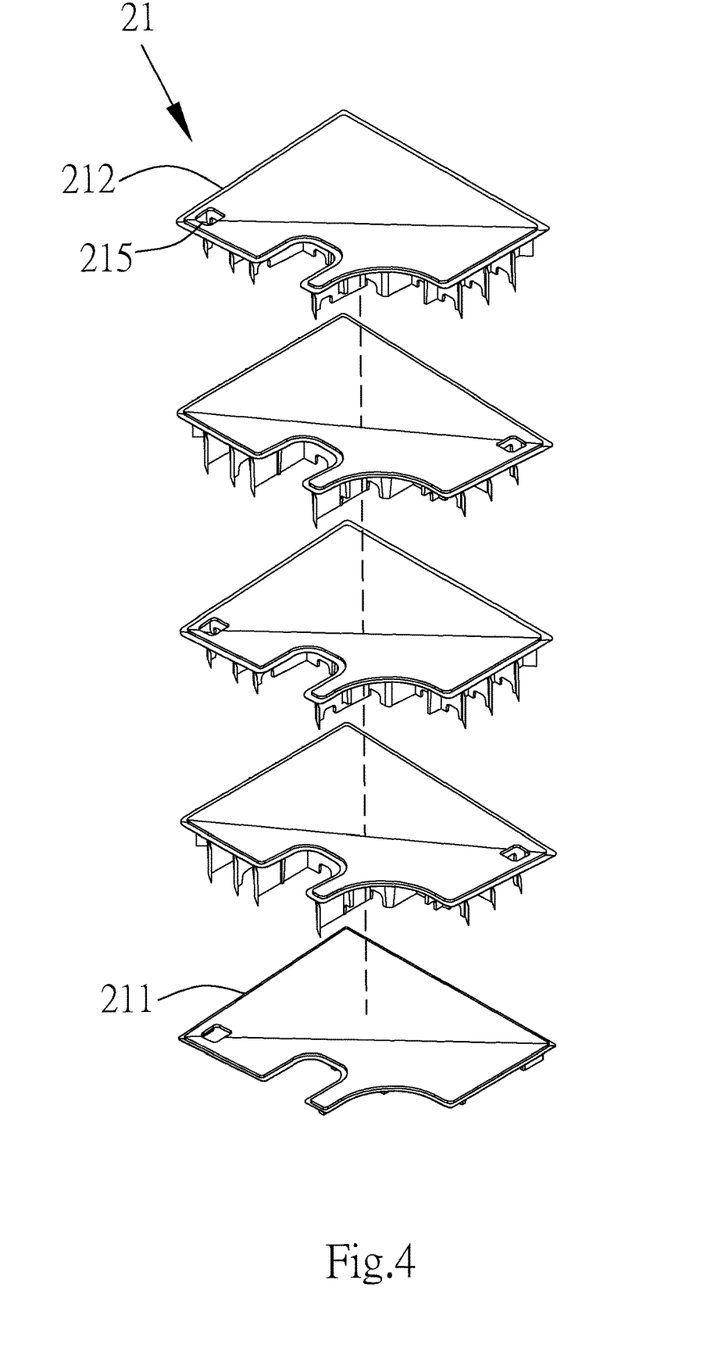
FIG. 4 is an exploded view showing a structure of a first filtration assembly of the present invention.
Figure 5:
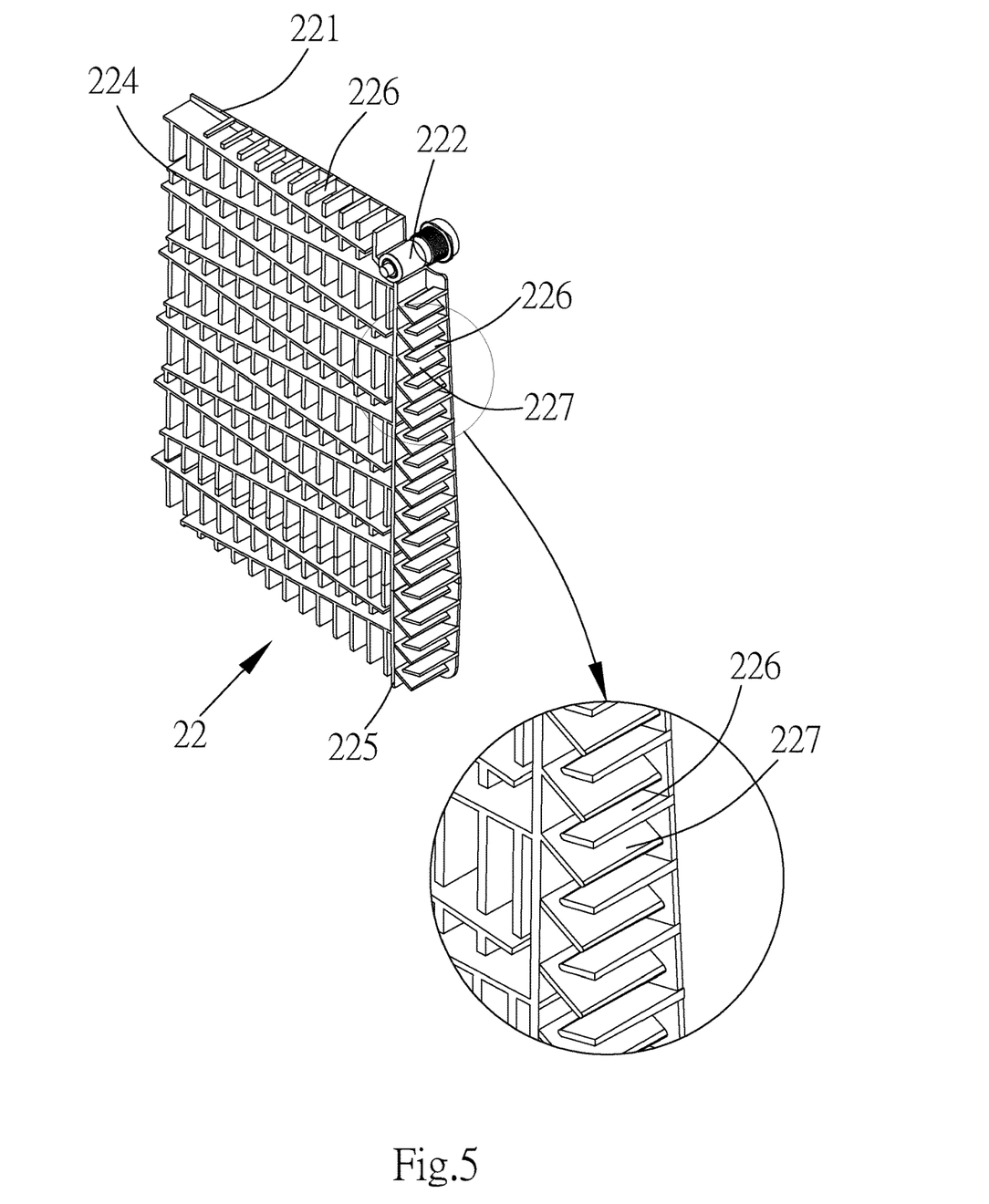
FIG. 5 is a schematic view illustrating a structure of a second filtration assembly of the present invention.
Figure 6:
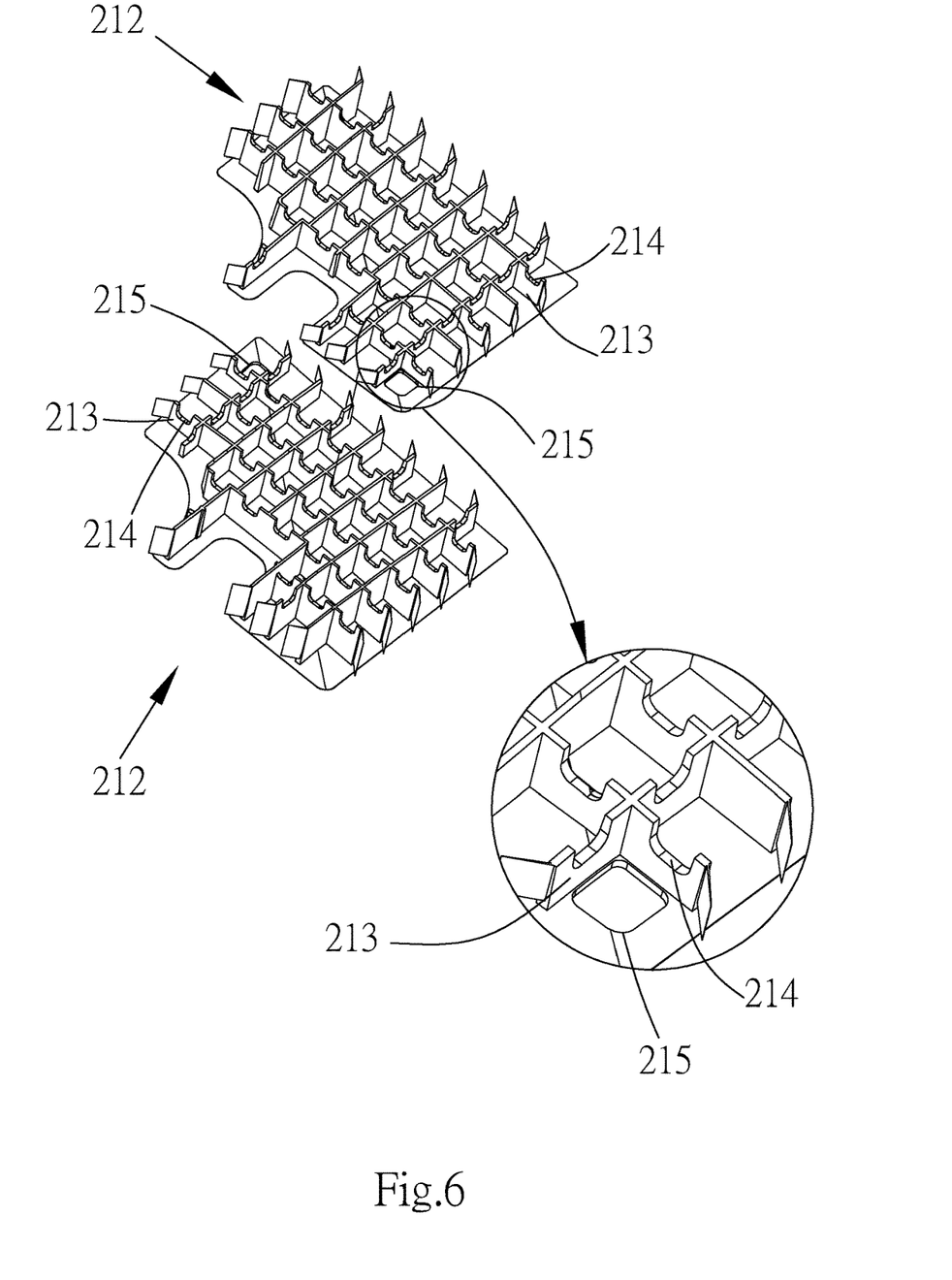
FIG. 6 is a schematic view showing a structure of a filtration member of the first filtration assembly of the present invention.

Referring further to FIGS. 4-6, FIG. 4 is an exploded view showing a structure of a first filtration assembly of the present invention; FIG. 5 is a schematic view illustrating a structure of a second filtration assembly of the present invention; and FIG. 6 is a schematic view showing a structure of a filtration member of the first filtration assembly of the present invention. The first filtration assembly 21 comprises a bottom board 211 and a plurality of filtration members 212, such that the plurality of filtration members 212 are stacked, in sequence, on the bottom board 211 to extend sideways. Each of the filtration members 212 is provided, on a surface thereof, with a plurality of first blocking plates 213 that are sequentially arranged and spaced from each other. Each of the first blocking plates 213 is provided with one opening 214. The bottom board 211 and each of the filtration members 212 are each provided with a through hole 215 formed therein such that the through holes 215 are staggered with respect to each other. The second filtration assembly 22 is arranged in a vertical direction in the interior of the casing 10 and the second filtration assembly 22 is set up at one lateral side of the first filtration assembly 21.

Figure 7:
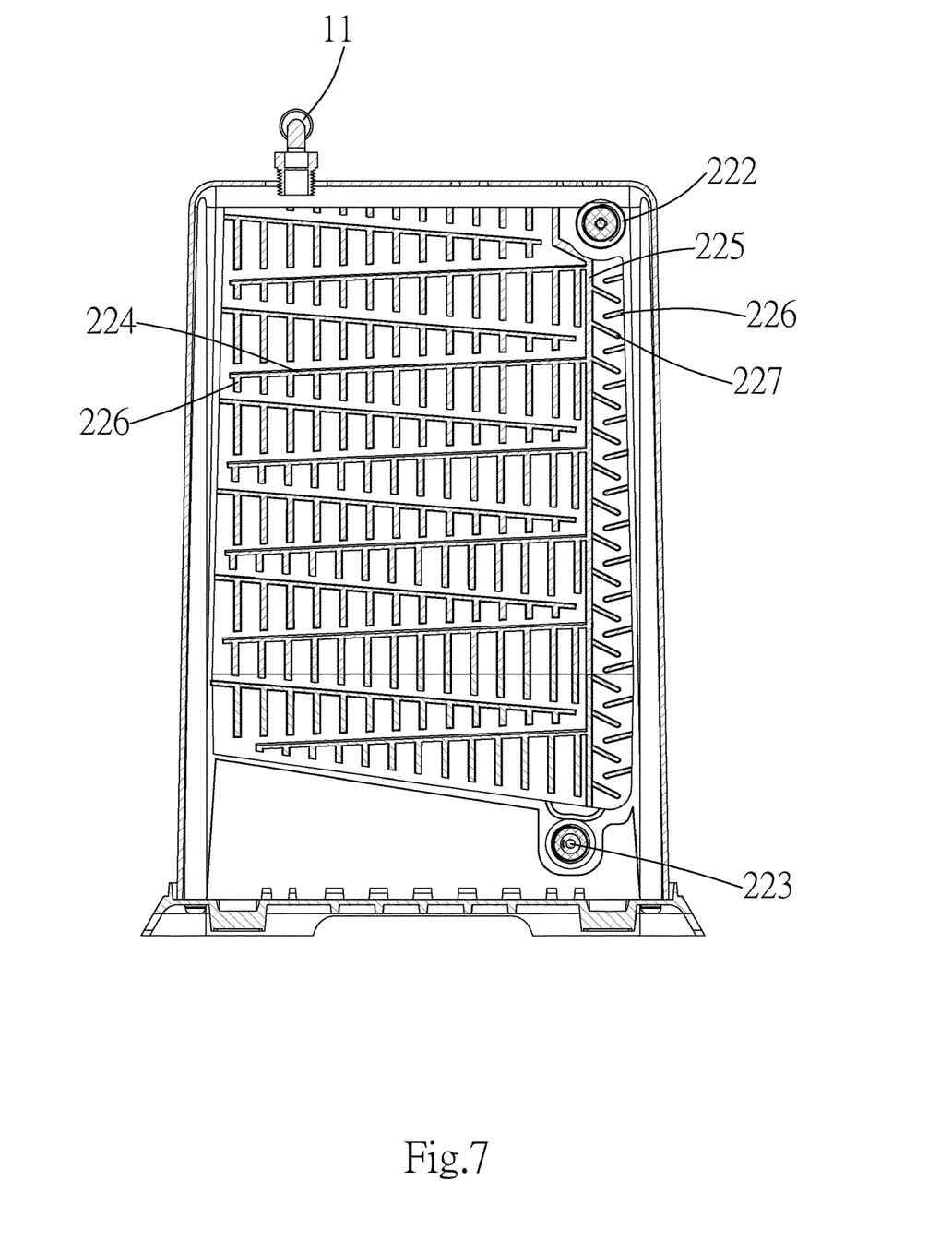
FIG. 7 is a cross-sectional view of the present invention.

Referring to FIG. 7, a cross-sectional view of the present invention is shown, wherein the second filtration assembly 22 further comprises a second filtration member 221, a gas outlet valve 222, a water inlet valve 223, a plurality of slope plates 224, a separation board 225, and a plurality of second blocking plates 226. The gas outlet valve 222 is provided on an upper end of the second filtration assembly 22 and the water inlet valve 223 is provided on a lower end of the second filtration assembly 22. The slope plates 224 and the separation board 225 are provided on a surface of the second filtration member 221 such that the slope plates 224 are sequentially arranged in a direction from top to bottom to be spaced from each other. Each of the slope plates 224 is provided with multiple ones of the second blocking plates 226, such that the multiple second blocking plates 226 are sequentially arranged in a direction from left to right to be spaced from each other. The separation board 225 is arranged adjacent to the slope plates 224, and the separation board 225 is provided on one side thereof with a plurality of inclined plates 227, such that the inclined plates 227 are sequentially arranged in a direction from top to bottom to be spaced from each other. The inclined plates 227 are arranged alternate with multiple ones of the second blocking plates 226.

Figure 8:
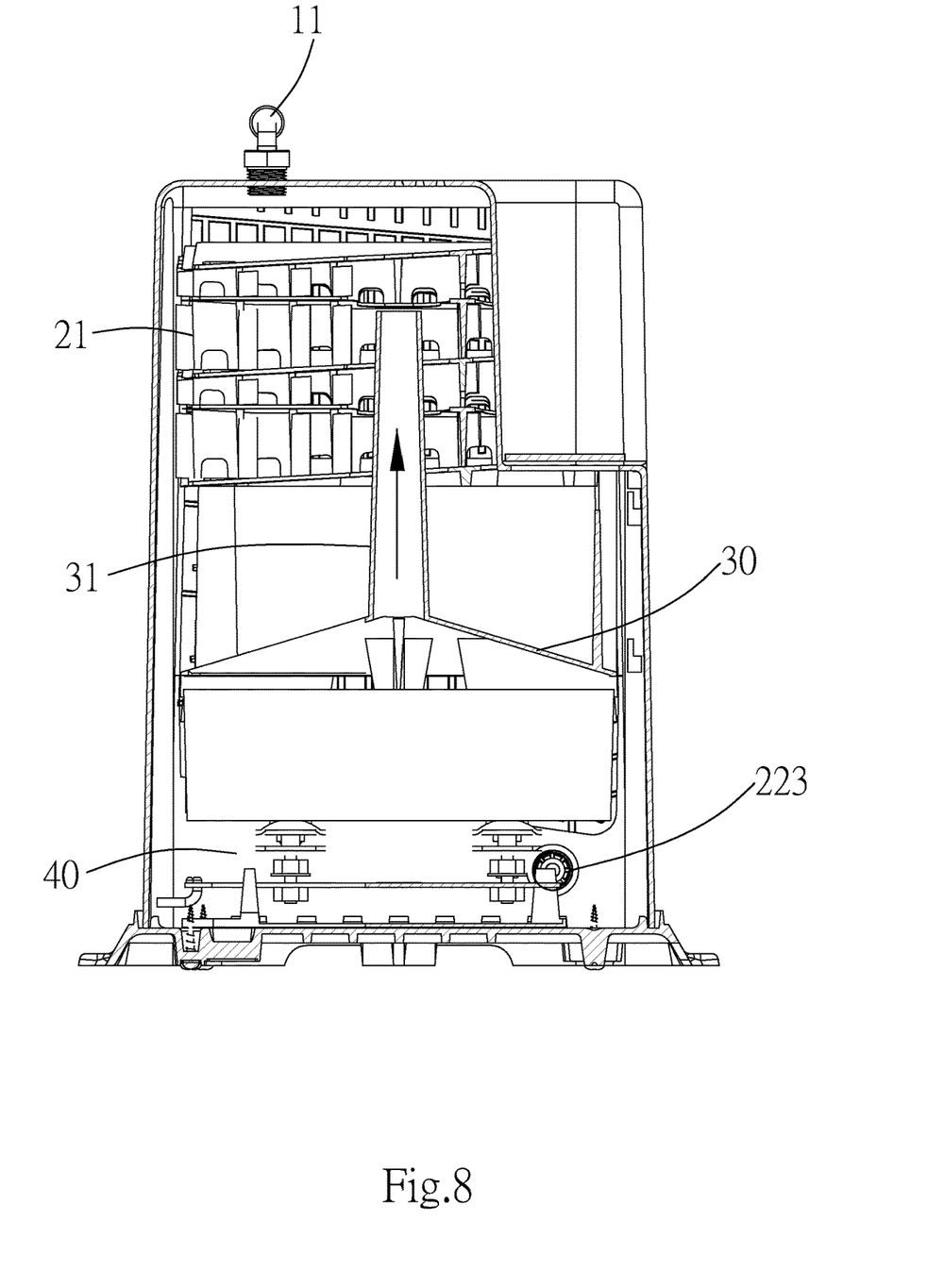
FIG. 8 is another cross-sectional view of the present invention.

Referring to FIG. 8, which shows another cross-sectional view of the present invention, and with additional reference being had to FIGS. 1-7, the compound green-energy purification device according to the present invention, when put into operation, a user may open and remove the lid 13 and fill water through the water inlet port 12 so that water flows through the hole 32 of the separation base 30 to get into the electrolysis unit 40 to allow the electrolysis unit 40 to heat and convert the water into steam, which moves, in sequence, through the pipe 31, the first filtration assembly 21, and the second filtration assembly 22 so as to separate the water and the gas from each other and allow the gas to discharge to the outside of the casing 10 through the gas outlet port 11, wherein the structural arrangements of the first blocking plates 213 of the filtration members 212 and the second blocking plates 226 of the second filtration member 221 are utilized to separate water and gas to allow the gas to pass through the gas outlet valve 222 and then moving through the gas outlet port 11 to discharge to the outside of the casing 10, while water moves through the water inlet valve 223 to return back to the electrolysis unit. The compound green-energy purification device of the present invention achieves effective separation of water and gas and allows water that has not been evaporated into gas to be recycled and reused for achieving an effect of saving energy.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A compound green-energy purification device, comprising:
    a casing, which comprises a water inlet port and a gas outlet port, the water inlet port having an opening that is provided with and selectively closed by a lid;
    a filtration module, which is arranged in an interior of the casing, the filtration module comprising a first filtration assembly and a second filtration assembly;
    an electrolysis unit, which is arranged in the interior of the casing; and
    a separation base, which is arranged in the interior of the casing and is located between the filtration module and the electrolysis unit, the separation base comprising a pipe and at least one hole formed therein such that the hole is located in a bottom of the separation base, wherein when water is supplied through the water inlet port, water flows through the hole of the separation base and gets into the electrolysis unit to allow the electrolysis unit to heat and convert the water into steam, which moves, in sequence, through the pipe, the first filtration assembly, and the second filtration assembly so as to separate the water and the gas from each other and allow the gas to discharge to the outside of the casing through the gas outlet port;
    wherein the second filtration assembly comprises a first portion and a second portion separated from each other by a separation board, the first portion comprising slope plates including at least a first slope and a second slope inclined upward in opposite directions so as to define a first passage between the first and second slopes to extend in a serpentine up/down direction, the second portion comprising a second passage extending in a serpentine up/down direction, the first passage being a wider serpentine pattern than the second passage, and the first passage and the second passage being separated from each other by the separation board;
    wherein the first filtration assembly comprises: a bottom board and a plurality of filtration members, such that the plurality of filtration members are stacked, in sequence, on the bottom board to extend sideways, each of the filtration members being provided, on a surface thereof, with a plurality of first blocking plates that are sequentially arranged and spaced from each other, each of the first blocking plates being provided with one opening, the bottom board and each of the filtration members being each provided with a through hole formed therein such that the through holes are staggered with respect to each other.

2. The compound green-energy purification device according to claim 1, wherein the second filtration assembly is arranged in a vertical direction in the interior of the casing and the second filtration assembly is set up at one lateral side of the first filtration assembly.

3. The compound green-energy purification device according to claim 2, wherein the second filtration assembly further comprises a second filtration member, a gas outlet valve, a water inlet valve, the slope plates, the separation board, and a plurality of second blocking plates, wherein the gas outlet valve is provided on an upper end of the second filtration assembly and the water inlet valve is provided on a lower end of the second filtration assembly; the slope plates and the separation board are provided on a surface of the second filtration member such that the slope plates are sequentially arranged in a direction from top to bottom to be spaced from each other; each of the slope plates is provided with multiple ones of the second blocking plates, such that the multiple second blocking plates are sequentially arranged in a direction from left to right to be spaced from each other; the separation board is arranged adjacent to the slope plates, and the separation board is provided on one side thereof with a plurality of inclined plates, such that the inclined plates are sequentially arranged in a direction from top to bottom to be spaced from each other; and the inclined plates are arranged alternate with multiple ones of the second blocking plates.

* * * * *